H. T. MURPHY.
SIGNAL.
APPLICATION FILED APR. 25, 1917.
1,244,883.
Patented Oct. 30, 1917.
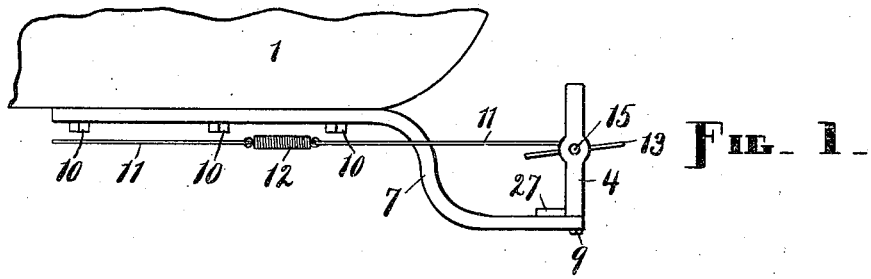
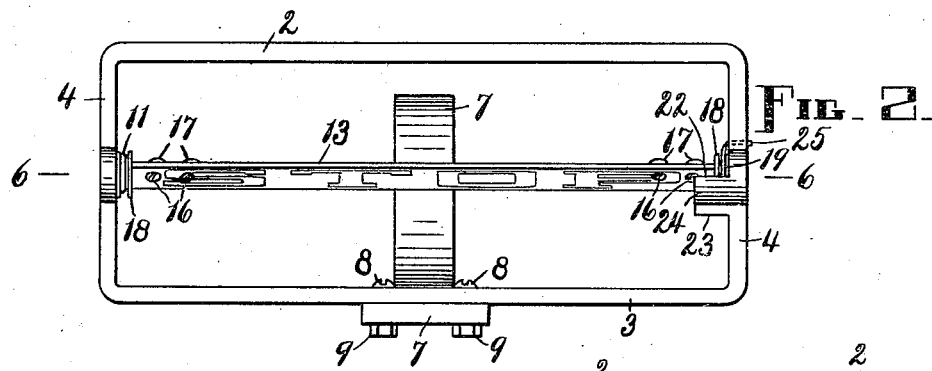
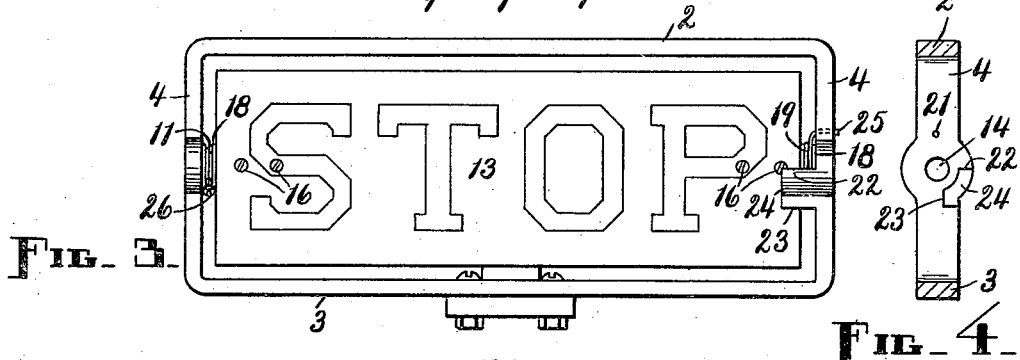
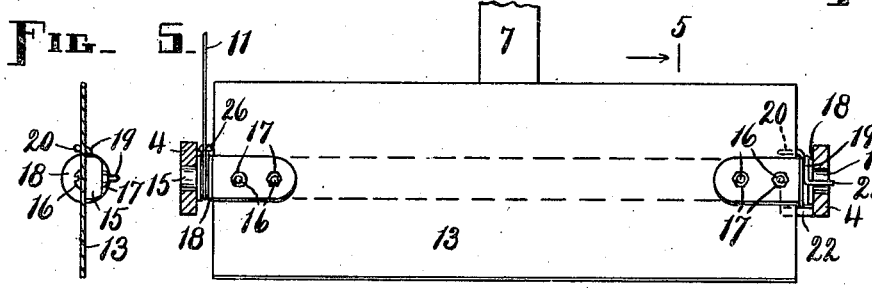
WITNESS:
A. C. Fairbanks
INVENTOR.
Harold T. Murphy,
BY
Frank A. Cutter,
ATTORNEY.

UNITED STATES PATENT OFFICE.

HAROLD T. MURPHY, OF SPRINGFIELD, MASSACHUSETTS.

SIGNAL.

1,244,883.

Specification of Letters Patent.

Patented Oct. 30, 1917.

Application filed April 25, 1917. Serial No. 164,384.

*To all whom it may concern:*

Be it known that I, HAROLD T. MURPHY, a citizen of the United States of America, residing at Springfield, in the county of Hampden and State of Massachusetts, have invented a new and useful Signal, of which the following is a specification.

My invention relates to improvements in signal devices adapted for use on automobiles and the like, and is in the nature of an improvement of the device disclosed in United States Letters Patent, No. 1,211,213, issued to me January 2, 1917.

This signal consists essentially of a support designed to be attached to a vehicle, and provided with stops, a shutter pivotally mounted at the ends in such support, and constituting the visual stop sign, or bearing on its face such sign, the range of rotary movement of said shutter being limited by said stops, means to retain said shutter normally in position to hide the sign face thereof and against one of said stops, and operating members connected with an axial member of said shutter in such a manner that the shutter is turned into position to expose said face when said operating member is pulled, all as hereinafter set forth.

The primary object of my invention is to provide, for an automobile or other vehicle, a comparatively inexpensive, structurally and operatively simple and easily operated, strong and durable visual signal, of few parts, to indicate that the vehicle equipped with the same is about to stop, which can be readily mounted at a suitable, conspicuous point on such vehicle, and which responds instantly to the moving or actuating impulse, and automatically returns to normal position.

A further object is to provide such a signal which may with the greatest facility be connected with the brake mechanism, either the brake-operating rod or the brake-pedal lever for example, of a vehicle, to the end that the sign is brought into view, to warn any following vehicle, the instant the brake member is moved to set the brake of said first-named vehicle, and retained in view until said brake member is released and returns to initial position again, when said sign disappears from view. Thus the signal becomes entirely automatic in action.

Still another object is to furnish a sufficient amount of flexibility and resiliency to the operating element of the signal to enable any reasonable connection to be made with a brake-mechanism or operating member, and to accommodate the signal to such member or the action thereof, and protect said signal from undue force or strain, while at the same time insuring reliable action on the part of the signal.

Other objects and advantages will appear in the course of the following description.

I attain the objects and secure the advantages of my invention by means illustrated in the accompanying drawings, in which—

Figure 1 is an end elevation of a practical form of my signal, showing one manner of application of the same to an automobile, or one point at which application is practicable and suitable; Fig. 2, an enlarged rear elevation of said signal, the shutter being in normal position with the sign hidden from the view of one in an automobile following; Fig. 3, an elevation similar to that shown in the preceding view, except that here said shutter is in position to expose said sign, or, in other words, the signal is set; Fig. 4, an enlarged cross-section through the frame of the device, looking toward the right-hand end of such frame as it stands in Figs. 2 and 3; Fig. 5, a cross-section through the shutter, taken on lines 5—5, looking in the direction of the associated arrow, in Fig. 6, and, Fig. 6, a longitudinal section through the signal, on lines 6—6, looking down, Fig. 2.

Similar reference numerals designate similar parts throughout the several views.

Although this device is designed especially for use on automobiles and similar vehicles, with which street-cars may be included, and to be connected with the brake mechanisms of the same, it may be applied to horse-drawn vehicles and operated by hand or otherwise. And although I have shown the signal attached to the rear end of the body of an automobile, it is to be understood that said signal may be attached to or mounted on an automobile at any convenient, desirable, and sufficiently conspicuous point.

In the first view a fragmentary portion of the rear end of an automobile body, in side elevation, is represented at 1.

The signal support includes a frame, which may be rectangular and consist of top and bottom bars 2 and 3, respectively, connected by end pieces 4, and a bracket 7 to the rear end of which the bottom bar 2 is secured by screws 8 and nuts 9. In the present case the bracket 7 is a bar which is bolted at 10 to the underside of the body 1. The bracket or bar 7 extends downwardly and rearwardly from and projects beyond the body 1, so that the signal frame is supported at a low enough elevation to permit the operating members to clear said body, such operating members consisting of cords, wires, or cables 11 and a spring 12. The form of the bracket 7 may be varied to meet different conditions incident to the location or position of the signal frame relative to the vehicle. In Fig. 6 a portion of the bracket 4 is broken off.

A flat, rectangular shutter 13 is mounted in the frame between the end pieces 4, there being an axial member at each end of said shutter, which member enters an opening 14, Fig. 4, in the end piece wherein such member is journaled. The axial members of the shutter 13, as here presented, consist of trunnions 15—15, each of which is secured to said shutter by screws 16—16 and nuts 17—17. The trunnions 15 are provided with annularly grooved hubs 18—18 between the ends of the shutter 13 and the end pieces 4 of the frame.

A spring 19 is coiled around one of the trunnion hubs 18 and has one end extended laterally in one direction to engage the obverse side or face of the shutter 13, as indicated at 20 in Figs. 5 and 6, and the other end extended laterally in the other direction to enter an opening 21, Fig. 4, in the contiguous end piece 4, such last-named end being designated by the numeral 25. The spring 19 is, therefore, arranged in such a manner that it tends to retain the shutter 13 in an approximately horizontal position, transversely, against a stop 22.

The stop 22 is so located that it retains the shutter 13, while left to the influence of the spring 19, in the position just indicated, and to return said shutter to such position, when the former is released to such influence after being acted upon by a superior force. The shutter 13 is preferably supported by the stop 22 with the rear edge a little above the horizontal plane of the front edge of the shutter, in order to facilitate initially the act of rocking the shutter into a vertical position, transversely. A stop 23, best shown in Fig. 4, is provided to limit the movement of the shutter 13 when actuated into the aforesaid vertical position, transversely. Thus it is seen that the shutter is permitted by the stops 22 and 23 to describe a little less than one-fourth of a revolution, or to be rocked from the approximately horizontal position, transversely, which it occupies in Figs. 1, 2, and 6, into the vertical position, transversely, which it occupies in Fig. 3 where the shutter is bearing against said stop 23, and the sign face is exposed to view from behind.

As a convenient means for providing the stops 22 and 23 a lug 24 is formed on the inside of one of the end pieces 4, such lug being so positioned and shaped that its upper edge forms the stop 22 and its under edge, or the front or inner side of said lug which rises from said under edge, the stop 23.

The under side of the shutter 13, when the latter is bearing on the stop 22, or the back side of said shutter, when the latter is bearing on the stop 23, is the obverse side or face of the shutter, and it is to this side or face that the sign is applied. Said sign may consist of any suitable means which is adapted to attract attention, such as the word "Stop." Or a color or colors may be used in place of the aforesaid word or its equivalent, or with the same. The word may appear on a red background for instance.

The back cable 11 has its rear end wound around or partly around the hub 18 which is at the opposite end of the shutter 13 from the hub 18 upon which the spring 19 is coiled, and is fastened to said first-named hub or secured in place thereon by some suitable means, as a screw 26. This back cable leads off from the top of the hub 18 to which it is attached, and when said cable is drawn forcibly forward it overcomes the resistance of the spring 19 and rotates said hub and attached parts and members until the shutter 13 encounters the stop 23. Upon the release of the hub to which the cable is attached, the spring 19 immediately acts to return the shutter to its former position.

The front cable 11 is usually attached at the forward end to a brake-operating member (not shown) of the vehicle, provided such a member be present and available, such as a brake rod or brake-pedal lever. Inasmuch as the draft movement of the brake-operating member with which the signal is connected, is greater than the draft movement required to operate said signal, it becomes necessary to make provision for the difference, consequently I employ two cables instead of one and introduce the spring 12 between. The spring 12 is of sufficient strength to overcome the resistance offered by the spring 19 and the frictional resistance of the parts, when the forward cable 11 is pulled. Initially, therefore, the pull put on the forward cable, by the member to which such cable is attached at the front end, draws both cables and the connecting spring forward until the shutter is thrown into "stop" position, and then, as said member continues to move forward, said spring lengthens and said first-named cable continues to travel with said member, while the rear cable becomes and remains stationary. The shutter is returned to normal position, by the spring 19, as soon as the spring 12 again contracts so that both cables can move rearwardly. The rear cable is unwound from its hub 18, without, of course, parting company with the same, in the first instance, and is rewound thereon in the second instance.

In practice, when the cables 11 are pulled or drawn forcibly forward, the shutter 13 is rocked into a transversely vertical position, with its sign-bearing face presented to the beholder in the rear. And, upon the release or backward return of the cables, the shutter 13 is rocked back into the former position, by the spring 19, with the sign-bearing face turned down out of sight. The action of the signal is certain and entirely automatic, unless it should be in some exceptional case where the cable or cables are drawn forward by hand or special hand-operated means.

By applying the operating means for the shutter 13, whereby the latter is rocked into position to expose its sign, which means here consist of the cables 11 connected by the spring 12, to the axis of said shutter, about or upon which axis one of said cables is wound and to which it is attached, I insure a stable, steady, and positive action in the sign-exposing operation, and avoid interference with the spring-action whereby the sign is caused to disappear. The spring 19 also may be said to be applied to the axis of the shutter, which fact is an advantage in this very much as in the other case. Furthermore, the stops 22 and 23 are adjacent to the aforesaid axis and on that account reduce the liability of rebound and of undue shock and jar on the part of the shutter when it strikes them.

A lug 27 is represented in Fig. 1 as extending forwardly from the base of the frame onto the bracket 7. This lug assists in bracing the frame against the pull of the cables.

What I claim as my invention, and desire to secure by Letters Patent, is—

1. As an improved article of manufacture, a signal comprising a supporting member, a frame connected with said member, and provided with fixed stops, a longitudinally horizontal shutter mounted to oscillate in said frame between said stops, said shutter having a sign face, means normally to retain said shutter in an approximately transverse horizontal position and in contact with one of said stops, and operating means having an axial connection with said shutter, and adapted to actuate the latter into an approximately transverse vertical position and into contact with the other of said stops.

2. As an improved article of manufacture a signal comprising a supporting member, a frame connected with said member, and provided with fixed stops, a longitudinally horizontal shutter mounted to oscillate in said frame between said stops, said shutter having a sign face, means normally to retain said shutter in an approximately transverse horizontal position and in contact with one of said stops, and yielding operating means having an axial connection with said shutter, and adapted to actuate the latter into an approximately transverse vertical position and into contact with the other of said stops.

3. The combination, in a signal, with a supporting member, a frame connected with such member, and provided with fixed stops, and a longitudinally horizontal shutter mounted in said frame to oscillate between said stops, said shutter having a sign face, of a spring coiled about the axis of said shutter at one end and bearing against said frame and said shutter, said spring being adapted normally to retain said shutter in an approximately transverse horizontal position and in contact with one of said stops, and operating means having an axial connection with said shutter, and adapted to actuate the latter, against the resiliency of said spring, into an approximately transverse vertical position and into contact with the other of said stops.

HAROLD T. MURPHY.

Witnesses:
F. A. CUTTER,
A. C. FAIRBANKS.

Copies of this patent may be obtained for five cents each, by addressing the "Commissioner of Patents, Washington, D. C."